(12) United States Patent
Huang et al.

(10) Patent No.: US 9,016,897 B1
(45) Date of Patent: Apr. 28, 2015

(54) INDUCTIVE LIGHT SOURCE MODULE

(71) Applicant: Cal-Comp Electronics & Communications Company Limited, New Taipei (TW)

(72) Inventors: Hsiu-Chi Huang, New Taipei (TW); Chih-Feng Lin, New Taipei (TW); Chun-Min Wang, New Taipei (TW); Yueh-Feng Lin, New Taipei (TW)

(73) Assignee: Cal-Comp Electronics & Communications Company Limited, New Taipei (TW)

( * ) Notice: Subject to any disclaimer, the term of this patent is extended or adjusted under 35 U.S.C. 154(b) by 0 days.

(21) Appl. No.: 14/156,398

(22) Filed: Jan. 15, 2014

(30) Foreign Application Priority Data

Nov. 26, 2013  (TW) .............................. 102143028 A

(51) Int. Cl.
*F21V 1/00* (2006.01)
*H05B 37/02* (2006.01)

(52) U.S. Cl.
CPC ...................................... *H05B 37/02* (2013.01)

(58) Field of Classification Search
CPC ....... F21V 5/045; F21V 29/70; F21V 29/004; F21Y 2101/02; F21Y 2111/004; F21S 11/002; F21S 11/007; G02B 5/0252; G02B 5/09; H05B 33/0815; H05B 37/02

USPC .......... 362/235, 240, 249.02, 249.11, 249.12, 362/249.14, 294; 315/307, 294, 312; 359/592, 599, 608, 611
See application file for complete search history.

(56) References Cited

U.S. PATENT DOCUMENTS

| | | | |
|---|---|---|---|
| 5,949,570 A * | 9/1999 | Shiono et al. .................. | 359/291 |
| 8,100,540 B2 * | 1/2012 | Huebner .......................... | 353/94 |
| 8,123,379 B2 | 2/2012 | Chen | |
| 2014/0043810 A1 * | 2/2014 | Jo et al. .......................... | 362/235 |
| 2014/0226330 A1 * | 8/2014 | Yun ................................ | 362/235 |

* cited by examiner

*Primary Examiner* — Haiss Philogene
(74) *Attorney, Agent, or Firm* — Jianq Chyun IP Office

(57) ABSTRACT

An inductive light-source module including a casing, a substrate, light sources, a circuit board, an infrared sensing device, a bi-incident lens and a control unit is provided. The substrate disposed in the casing includes a carrying surface facing a transparent portion of the casing. The light sources connected to the substrate are disposed on the carrying surface. The infrared sensing device is connected to the circuit board. The bi-incident lens disposed on the transparent portion is located on a light path of each light for scattering visible lights to pass through the transparent portion and transmit to the outside, and converging the infrared from the outside to the infrared sensing device. The control unit is coupled to the light sources and the infrared sensing device to drive the light sources to emit the visible lights according to a sensing signal generated by the infrared sensing device when sensing the infrared.

10 Claims, 4 Drawing Sheets

INDUCTIVE LIGHT SOURCE MODULE

CROSS-REFERENCE TO RELATED APPLICATION

This application claims the priority benefit of Taiwan application serial no. 102143028, filed on Nov. 26, 2013. The entirety of the above-mentioned patent application is hereby incorporated by reference herein and made a part of this specification.

BACKGROUND

1. Technical Field

The technical field relates to a light source module. Particularly, the technical field relates to an inductive light source module.

2. Related Art

In general residence and office premises, when a blackout disaster caused by human or natural factors is encountered, such as power off, outage or fire disaster, etc., is occurred, people are plunged into darkness without warning and cannot conduct any action. To escape, besides emergency lighting equipment is required, a flashlight has to be provided to facilitate smooth escaping. Moreover, in general residence and office premises, it is also required to guard against burglary, so that security lights are installed, by which infrared generated by human body is detected by an infrared sensor to activate illumination.

Presently, the lighting device adopts a light source module having an inductive switch, which generally adopts an infrared sensing method, by which when a warm-blooded animal walks into a sensing range of the inductive light source module; a light source of the inductive light source module is driven to emit light. Power consumption of such infrared inductive switch is relatively less compared to that of an active photo interrupter switch, and the infrared inductive switch is not liable to be interfered by falling leaves and movement of non-warm-blooded animal as that does of the active photo interrupter switch, and is not limited by a body size of the warm-blooded animal as long as a heat source variation of the warm-blooded animal is enough to be detected by the infrared sensor. However, such infrared inductive switch is liable to be interfered by sunlight or a light source of the light source module itself to cause malfunction. Therefore, a mask has to be additionally installed in the light source module at a region where the infrared sensing device is located to prevent light source interference, which not only increases mechanism complexity of the light source module, but also leads to dark area of the light source module to cause non-uniform lighting. Therefore, how to eliminate the aforementioned defects is an important issue of the industry.

SUMMARY

One of exemplary embodiment is directed to an inductive light source module, which has good light-emitting uniformity and sensing accuracy.

The exemplary embodiment provides an inductive light source module including a casing, a substrate, a plurality of visible light sources, a circuit board, an infrared sensing device, a bi-incident lens and a control unit. The casing includes a transparent portion. The substrate is disposed in the casing and includes a carrying surface. The carrying surface faces the transparent portion. The visible light sources are electrically connected to the substrate and are disposed on the carrying surface to emit visible lights. The circuit board is disposed in the casing and is electrically connected to the substrate. The infrared sensing device is electrically connected to the circuit board to sense infrared coming from external environment. The bi-incident lens is disposed on the transparent portion and is located on a light path of each visible light for scattering the visible light to pass through the transparent portion and transmit to the external environment, and converging the infrared coming from the external environment to the infrared sensing device. The control unit is coupled to the visible light sources and the infrared sensing device, the infrared sensing device senses the infrared to generate a sensing signal, and the control unit drives the visible light sources to emit the visible lights according to the sensing signal.

According to the above descriptions, In the exemplary embodiment, the bi-incident lens capable of simultaneously scattering the visible lights and converging the infrared is disposed on the transparent portion of the casing, and the visible lights emitted from the visible light sources are scattered to the whole transparent portion through the bi-incident lens, such that the visible lights are uniformly propagated to the external environment through the transparent portion to achieve a uniform light-emitting effect. Moreover, the bi-incident lens further converges the infrared that is incident to internal of the casing from the external environment to the infrared sensing device. Therefore, when someone or warm-blooded animal passes through a sensing range of the inductive light source module, the infrared sensing device senses the infrared emitted by human body or warm-blooded animal, and the control unit accordingly drives the visible light sources to emit visible lights to provide illumination. In this way, the inductive light source module of the disclosure can prevent the visible lights from interfering the infrared sensing device without a mask disposed therebetween, by which not only mechanism complexity of the inductive light source module is decreased, the sensing accuracy of the infrared sensing device is also enhanced. Moreover, the visible lights emitted by the visible light sources are scattered to the whole transparent portion through the bi-incident lens, and the light-emitting uniformity of the inductive light source module is further enhanced.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

The present disclosure will now be described more fully with reference to the accompanying drawings, in which exemplary embodiments of the disclosure are shown. The terms used herein such as "above", "below", "front", "back", "left" and "right" are for the purpose of describing directions in the figures only and are not intended to be limiting of the disclosure. Moreover, in the following embodiments, the same or similar devices are denoted by the same or similar referential numbers.

Figure 1:
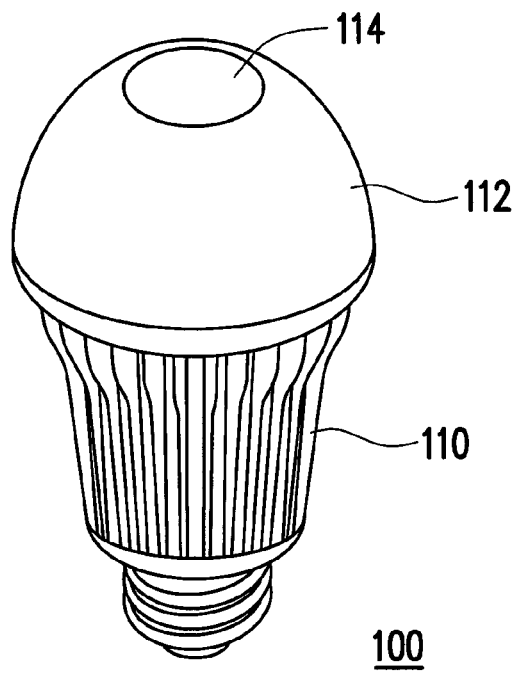
FIG. 1 is a schematic diagram of an inductive light source module according to an exemplary embodiment.
Figure 2:
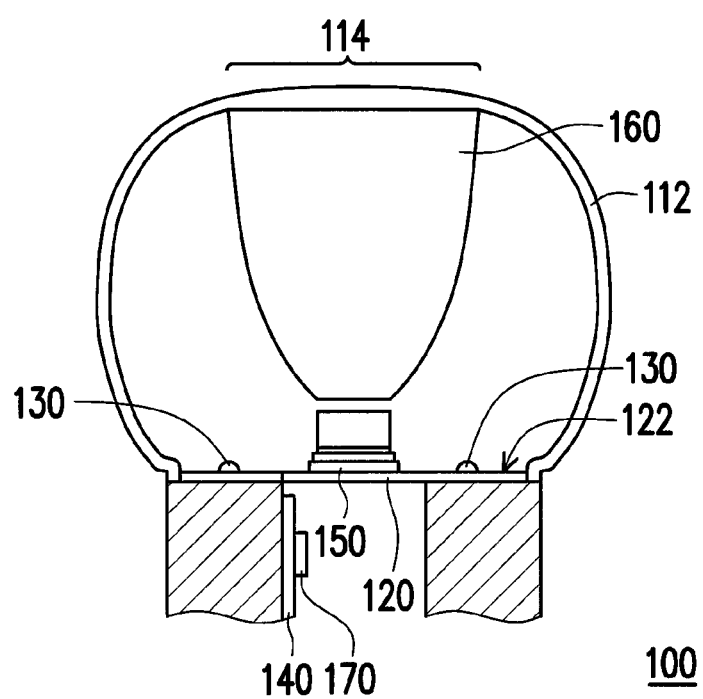
FIG. 2 is a partial cross-sectional view of an inductive light source module according to an exemplary embodiment.

FIG. 1 is a schematic diagram of an inductive light source module according to an exemplary embodiment. FIG. 2 is a partial cross-sectional view of an inductive light source module according to an exemplary embodiment. Referring to FIG. 1 and FIG. 2, in the present embodiment, the inductive light source module 100 includes a casing 110, a substrate 120, a plurality of visible light sources 130, a circuit board 140, an infrared sensing device 150, a bi-incident lens 160 and a control unit 170. The casing 110 includes a transparent portion 112 configured in a light-emitting region of the casing 110. The substrate 120 is disposed in the casing 110 and includes a carrying surface 122. The carrying surface 122 faces the transparent portion 112. The visible light sources 130 are disposed on the carrying surface 122 of the substrate 120 and are electrically connected to the substrate 120 and to emit visible lights. In the present embodiment, the visible light sources 130 are light-emitting diodes (LED) or other suitable light sources, and the type of the visible light source 130 is not limited by the disclosure. The circuit board 140 is disposed in the casing 110, and is electrically connected to the substrate 120.

Figure 3:
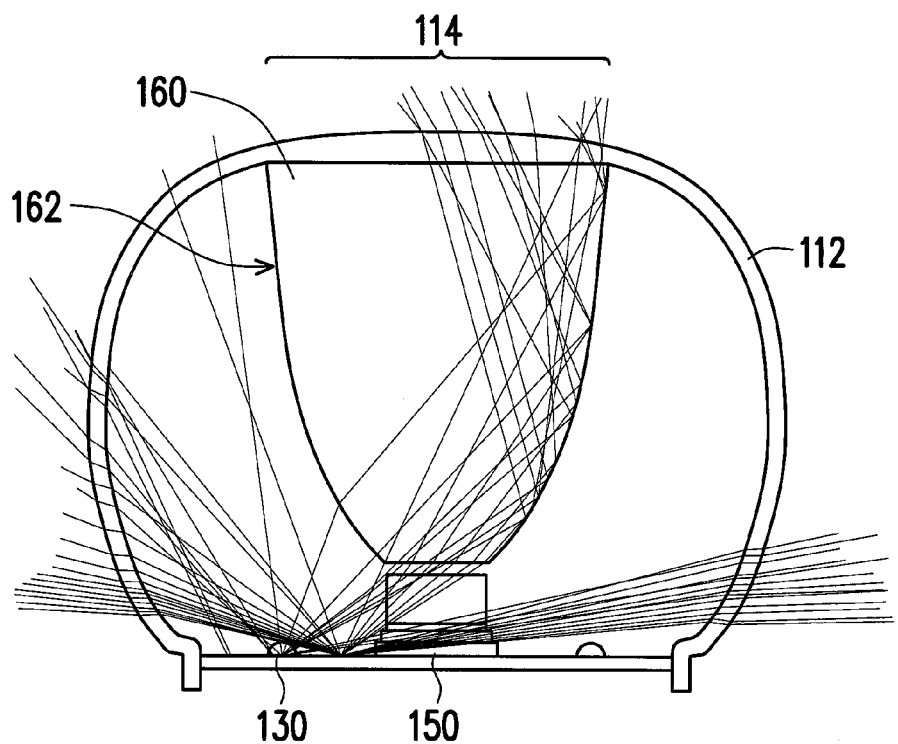
FIG. 3 is a schematic diagram of a visible light path of the inductive light source module of FIG. 2.
Figure 4:
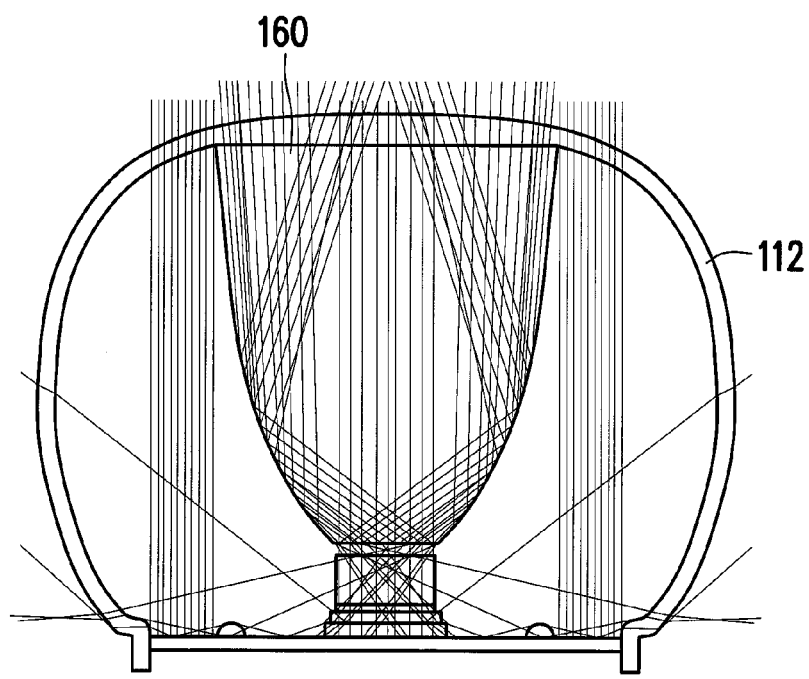
FIG. 4 is a schematic diagram of an infrared path of the inductive light source module of FIG. 2.

FIG. 3 is a schematic diagram of a visible light path of the inductive light source module of FIG. 2. FIG. 4 is a schematic diagram of an infrared path of the inductive light source module of FIG. 2. Referring to FIG. 2 to FIG. 4, as that described above, the infrared sensing device 150 is electrically connected to the circuit board 140 to sense the infrared coming from external environment. The bi-incident lens 160 is disposed on an infrared sensing region 114 of the transparent portion 112, and is located on a light path of the visible lights for scattering the visible lights as shown in FIG. 3, such that the visible lights are uniformly scattered to the whole transparent portion 112, and passes through the transparent portion 112 for transmitting to the external environment. In the present embodiment, the infrared sensing device 150 can be an infrared sensing module, which may include a sensing device circuit board and an infrared sensor as that shown in FIG. 2, where the sensing device circuit board is disposed on the substrate 120, and the infrared sensor is disposed on the sensing device circuit board. Moreover, the bi-incident lens 160 includes an incident surface 162 corresponding to each of the visible light sources 130, where the visible lights emitted by each of the visible light sources 130 are vertically incident to the incident surface 162, and are uniformly scattered to the transparent portion 112 through the bi-incident lens 160.

In the present embodiment, the bi-incident lens 160 can be implemented by adopting Fresnel lens principle, and a material thereof can be polypropylene (PP) resin having better infrared transmittance or other suitable materials, which is not limited by the disclosure, and as long as the bi-incident lens is capable of simultaneously scattering the visible lights and converging the infrared, it can be applied to the disclosure. It should be noticed that the light paths of the visible lights emitted by the visible light sources 130 located to the left side of FIG. 3 are shown by thin solid lines. Therefore, according to FIG. 3, it is known that the visible lights can be scattered to the infrared sensing region 114 of the transparent portion 112 through the bi-incident lens 160, such that the visible lights can be uniformly transmitted to external environment through the transparent portion 112 to achieve a uniform light-emitting effect.

Besides, the bi-incident lens 160 can also converge the infrared coming from the external environment to the infrared sensing device 150. In the present embodiment, the infrared sensing device 150 can be disposed on the substrate 120 as that shown in FIG. 2, and is located at a focus of the bi-incident lens 160, such that the infrared outside the casing 110 can be incident to internal of the casing 110 through the infrared sensing region 114, and the infrared is converged to the infrared sensing device 150 through the bi-incident lens 160 as that shown in FIG. 4. The visible light sources 130 surround the infrared sensing device 150. In the present embodiment, the infrared sensing device 150 can be a pyroelectric infrared (PIR) sensor; certainly, those with ordinary skills in the art should understand that the type of the infrared sensing device 150 is not limited by the disclosure. In this way, since the human body or warm-blooded animal may emit infrared, when someone or a warm-blooded animal passes through the sensing range of the inductive light source module 100, the infrared sensing device 150 can be used to detect the infrared to determine whether someone or a warm-blooded animal passes through the sensing range of the inductive light source module 100.

Figure 5:
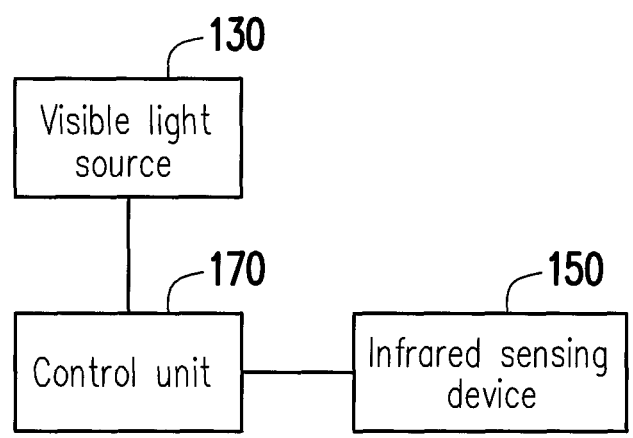
FIG. 5 is a block schematic diagram of a part of components of an inductive light source module according to an exemplary embodiment.

FIG. 5 is a block schematic diagram of a part of components of an inductive light source module according to an exemplary embodiment. Referring to FIG. 3 to FIG. 5, in detail, the control unit 170 is coupled to the visible light sources 130 and the infrared sensing device 150 as that shown in FIG. 5, and the infrared sensing device 150 senses the infrared to generate a sensing signal. The control unit 170 drives the visible light sources 130 to emit visible lights according to the sensing signal. In this way, when someone or other warm-blooded animal passes through the sensing range of the inductive light source module 100, the infrared sensing device 150 detects the infrared emitted by the human body or the other warm-blooded animal, and the control unit 170 accordingly drives the visible light sources 130 to emit the visible lights to provide illumination.

Figure 6:
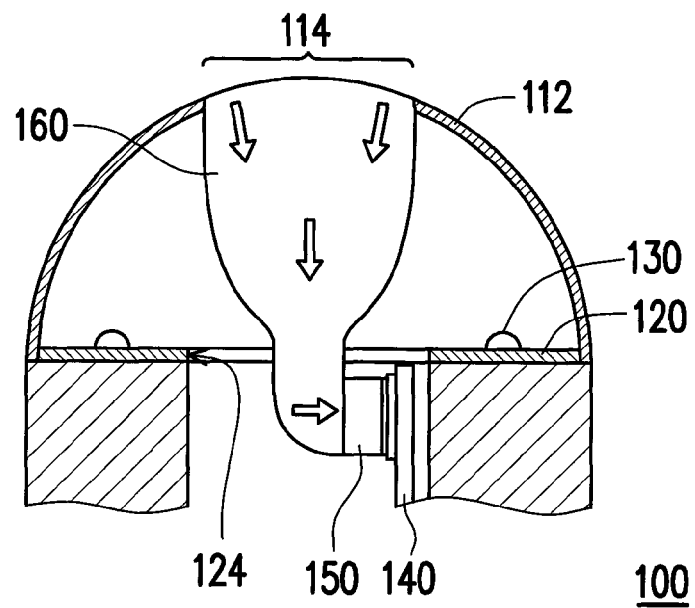
FIG. 6 is a partial cross-sectional view of an inductive light source module according to another exemplary embodiment.

FIG. 6 is a partial cross-sectional view of an inductive light source module according to another exemplary embodiment. It should be noticed that the inductive light source module 100 of the present embodiment is similar to the inductive light source module 100 of FIG. 2, so that reference numbers of the components and a part of contents of the aforementioned embodiment are also used in the present embodiment, where the same reference numbers denote the same or like components, and descriptions of the same technical contents are omitted. The aforementioned embodiment can be referred for descriptions of the omitted parts, and detailed descriptions thereof are not repeated in the following embodiment. A difference between the inductive light source module 100 of the present embodiment and the inductive light source module 100 of FIG. 2 is described below.

Referring to FIG. 6, in the present embodiment, the circuit board 140 is, for example, disposed in parallel to a normal direction of the substrate 120. The infrared sensing device 150 is disposed on the circuit board 140. In detail, the substrate 120 has an opening 124 at the center of the substrate 120. The circuit board 140 is disposed in the opening 124, and the bi-incident lens 160 extends into the opening 124 and is connected to the infrared sensing device 150. In this way, the infrared sensing device 150 can be directly disposed on the circuit board 140 without first disposing the infrared sensor on the sensing device circuit board and then disposing the sensing device circuit board on the substrate 120 as that does in the aforementioned embodiment. Namely, according to the configuration of the present embodiment, it is unnecessary to additionally set the sensing device circuit board shown in FIG. 2, so as to save a manufacturing cost. It should be noticed that in FIG. 6, hollow arrows are used to indicate a transmission path of the infrared within the bi-incident lens 160. Therefore, according to FIG. 6, it is known that the infrared outside the casing 110 is incident to internal of the casing 110 through the infrared sensing region 114, and the infrared is converged to the infrared sensing device 150 through the bi-incident lens 160 as that shown in FIG. 6. The infrared sensing device 150 senses the infrared to generate the sensing signal, and the control unit 170 drives the visible light sources 130 to emit visible lights according to the sensing signal to provide illumination. Moreover, the visible lights emitted by the visible light sources 130 can be scattered to the whole transparent portion 112 (including the infrared sensing region 114 of the transparent portion 112) through the bi-incident lens 160, such that the visible lights can be uniformly transmitted to external environment through the transparent portion 112 to achieve the uniform light-emitting effect.

Figure 7:
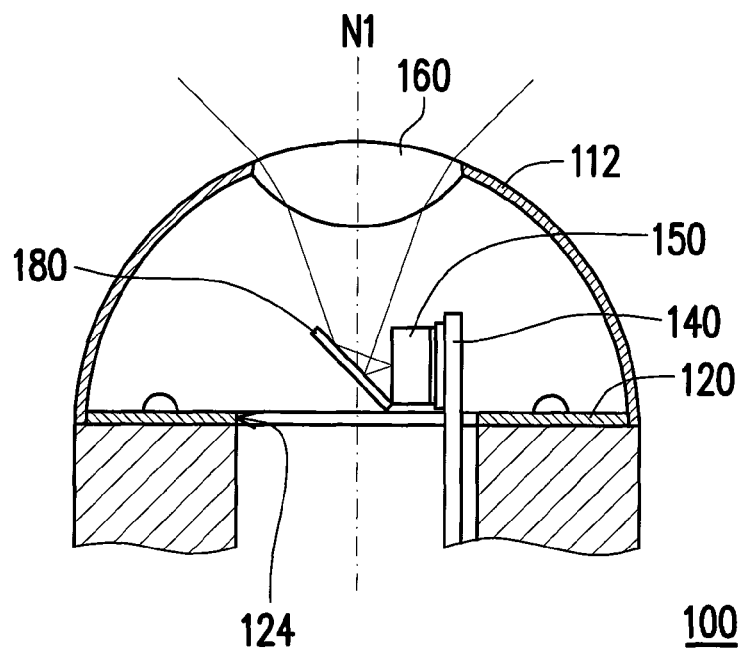
FIG. 7 is a partial cross-sectional view of an inductive light source module according to another exemplary embodiment.

FIG. 7 is a partial cross-sectional view of an inductive light source module according to another exemplary embodiment. It should be noticed that the inductive light source module 100 of the present embodiment is similar to the inductive light source module 100 of FIG. 2, so that reference numbers of the components and a part of contents of the aforementioned embodiment are also used in the present embodiment, where the same reference numbers denote the same or like components, and descriptions of the same technical contents are omitted. The aforementioned embodiment can be referred for descriptions of the omitted parts, and detailed descriptions thereof are not repeated in the following embodiment. A difference between the inductive light source module 100 of the present embodiment and the inductive light source module 100 of FIG. 2 is described below.

Referring to FIG. 7, in the present embodiment, the inductive light source module 100 further includes a reflector 180, where the reflector 180 is located at a focus of the bi-incident lens 160, and an acute included angle is formed between the reflector 180 and a normal direction N1 of the substrate 120. The circuit board 140 is disposed in parallel to the normal direction N1. The infrared sensing device 150 is disposed on the circuit board 140. In detail, the substrate 120 has the opening 124 at the center of the substrate 120. The circuit board 140 passes through the opening 124 and protrudes out from the carrying surface 122. The infrared sensing device 150 is disposed on the circuit board 140 at a portion protruding out of the carrying surface 122. In this way, the infrared sensing device 150 can be directly disposed on the circuit board 140 without first disposing the infrared sensor on the sensing device circuit board and then disposing the sensing device circuit board on the substrate 120 as that does in the aforementioned embodiment. Namely, according to the configuration of the present embodiment, it is unnecessary to additionally set the sensing device circuit board shown in FIG. 2, so as to save a manufacturing cost. In this way, when someone or other warm-blooded animal walks through the sensing range of the inductive light source module 100, the inductive light source module 100 converges the infrared emitted by the human body or the other warm-blooded animal to the focus of the bi-incident lens 160, and the reflector 180 reflects the infrared to the infrared sensing device 150. The infrared sensing device 150 detects the infrared to generate the sensing signal, and the control unit 170 drives the visible light sources 130 to emit the visible lights according to the sensing signal to provide illumination In summary, the bi-incident lens capable of simultaneously scattering the visible lights and converging the infrared is disposed on the transparent portion of the casing, and the visible lights emitted from the visible light sources are scattered to the whole transparent portion through the bi-incident lens, such that the visible lights are uniformly propagated to the external environment through the transparent portion to achieve a uniform light-emitting effect. Moreover, the bi-incident lens further converges the infrared that is incident to internal of the casing from the external environment to the infrared sensing device. Therefore, when someone or warm-blooded animal passes through the sensing range of the inductive light source module, the infrared sensing device senses the infrared emitted by human body or the other warm-blooded animal, and the control unit accordingly drives the visible light sources to emit visible lights to provide illumination. In this way, the inductive light source module of the disclosure can prevent the visible lights from interfering the infrared sensing device without using a mask, by which not only mechanism complexity of the inductive light source module is decreased, the sensing accuracy of the infrared sensing device is also enhanced, so as to avoid a problem of uneven light-emitting effect of a conventional inductive light source module caused by configuration of the mask. Moreover, the visible lights emitted by the visible light sources are scattered to the whole transparent portion through the bi-incident lens, and the light-emitting uniformity of the inductive light source module is further enhanced.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:
1. An inductive light source module, comprising:
 a casing, comprising a transparent portion;
 a substrate, disposed in the casing and comprising a carrying surface, wherein the carrying surface faces the transparent portion;
 a plurality of visible light sources, disposed on the carrying surface and configured to emit a plurality of visible lights, wherein each of the visible light sources is electrically connected to the substrate;
 a circuit board, disposed in the casing, and electrically connected to the substrate;
 an infrared sensing device, electrically connected to the circuit board, and configured to sense infrared coming from external environment;
 a bi-incident lens, disposed on the transparent portion and located on a light path of each visible light for scattering the visible lights, wherein the visible lights are uniformly scattered to the transparent portion and are transmitted to the external environment, and converging the infrared coming from the external environment to the infrared sensing device; and
 a control unit, coupled to the visible light sources and the infrared sensing device, wherein the infrared sensing device senses the infrared to generate a sensing signal, and the control unit drives the visible light sources to emit the visible lights according to the sensing signal.

2. The inductive light source module as claimed in claim 1, wherein the infrared sensing device is disposed on the substrate and is located at a focus of the bi-incident lens, and the visible light sources are disposed around the infrared sensing device.

3. The inductive light source module as claimed in claim 1, wherein the circuit board is disposed in parallel to a normal direction of the substrate, and the infrared sensing device is disposed on the circuit board.

4. The inductive light source module as claimed in claim 3, wherein the substrate has an opening at a center thereof, the circuit board is disposed in the opening, and the bi-incident lens extends into the opening and is connected to the infrared sensing device.

5. The inductive light source module as claimed in claim 1, further comprising a reflector located at a focus of the bi-incident lens, wherein an acute included angle is formed between the reflector and a normal direction of the substrate, the circuit board is disposed in parallel to the normal direction, the infrared sensing device is disposed on the circuit board, and the infrared coming from external environment is converged to the focus through the bi-incident lens and is reflected to the infrared sensing device by the reflector.

6. The inductive light source module as claimed in claim 5, wherein the substrate has an opening at a center thereof, the circuit board is disposed in the opening, and protrudes out of the carrying surface, and the infrared sensing device is disposed on the circuit board at a portion protruding out of the carrying surface.

7. The inductive light source module as claimed in claim 1, wherein the bi-incident lens comprises an incident surface corresponding to each of the visible light sources, and the visible light emitted by each of the visible light sources is vertically incident to the corresponding incident surface, and is uniformly scattered to the transparent portion through the bi-incident lens.

8. The inductive light source module as claimed in claim 1, wherein the infrared sensing device comprises a pyroelectric infrared (PIR) sensor.

9. The inductive light source module as claimed in claim 1, wherein the visible light sources comprise a plurality of light-emitting diode (LED) light sources.

10. The inductive light source module as claimed in claim 1, wherein a material of the bi-incident lens comprises polypropylene (PP) resin.

* * * * *